(12) United States Patent
Kasuo et al.

(10) Patent No.: US 7,977,909 B2
(45) Date of Patent: Jul. 12, 2011

(54) DEVICE AND METHOD OF DRIVING STEPPING MOTOR OF ANALOG ELECTRONIC CLOCK

(75) Inventors: Tomoo Kasuo, Hamura (JP); Fumiaki Ochiai, Akishima (JP); Yohei Kawaguchi, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 324 days.

(21) Appl. No.: 12/389,445

(22) Filed: Feb. 20, 2009

(65) Prior Publication Data

US 2009/0206789 A1     Aug. 20, 2009

(30) Foreign Application Priority Data

Feb. 20, 2008  (JP) ................................. 2008-038095

(51) Int. Cl.
*H02P 8/02* (2006.01)
*G05B 19/40* (2006.01)

(52) U.S. Cl. .......... 318/696; 318/254; 318/685; 368/47; 368/76; 368/157

(58) Field of Classification Search .................. 318/254, 318/685, 696; 368/47, 76, 17

See application file for complete search history.

(56) References Cited

U.S. PATENT DOCUMENTS

| | | | |
|---|---|---|---|
| 4,326,278 A | 4/1982 | Shida et al. | |
| 6,108,279 A | 8/2000 | Hara | |
| 6,349,075 B1 * | 2/2002 | Miyauchi et al. | 368/230 |
| 6,476,579 B1 * | 11/2002 | Akahane et al. | 318/696 |
| 6,999,381 B2 * | 2/2006 | Fujisawa et al. | 368/47 |
| RE40,370 E * | 6/2008 | Sato et al. | 368/157 |
| 2003/0174584 A1 * | 9/2003 | Fujisawa et al. | 368/47 |

FOREIGN PATENT DOCUMENTS

| | | |
|---|---|---|
| JP | 58-213279 A | 12/1983 |
| JP | 61-40949 B2 | 9/1986 |
| JP | 6-43266 A | 2/1994 |
| JP | 10-225185 A | 8/1998 |
| JP | 2005-195436 A | 7/2005 |

OTHER PUBLICATIONS

M. Ueda et al; Adaptive Controlled Drive System of Stepping Motor for Analog Quartz Watch; The Horological Institute of Japan; 1980; No. 92; pp. 1-13.
Chinese Office Action dated Jul. 8, 2010 and English translation thereof, issued in counterpart Chinese Application No. 200910008006.2.
Japanese Office Action dated Dec. 15, 2009 and English translation thereof issued in a counterpart Japanese Application No. 2008-038095.

* cited by examiner

*Primary Examiner* — Paul Ip
(74) *Attorney, Agent, or Firm* — Holtz, Holtz, Goodman & Chick, PC

(57) ABSTRACT

A stepping motor driving apparatus of an analog electronic clock, in which, when the rotation of a rotor is not detected after a pulse is supplied to a coil of a stepping motor, a first switching control section switches the pulse supplied to the coil to a pulse having a larger effective value, and when the rotation of the rotor is detected continuously for a predetermined period or a predetermined number of times, a second switching control section switches the pulse supplied to the coil to a pulse having a smaller effective value, wherein the apparatus further includes a third switching control section that switches a driving pulse to a pulse having a smaller effective value when the rotation of the rotor is not detected for two times continuously, even after the first switching section increases the effective value of the driving pulse for two times continuously.

14 Claims, 5 Drawing Sheets

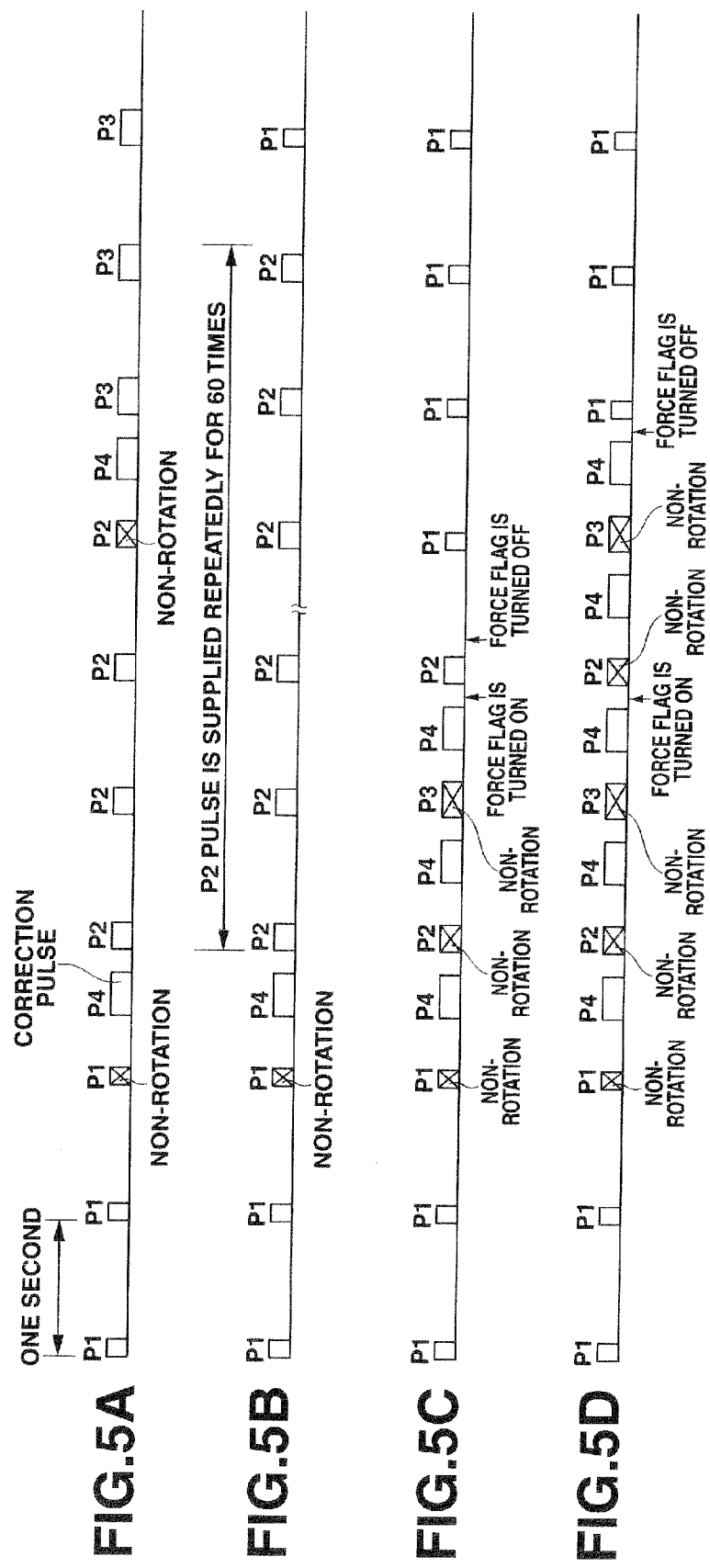

DEVICE AND METHOD OF DRIVING STEPPING MOTOR OF ANALOG ELECTRONIC CLOCK

CROSS-REFERENCE TO RELATED APPLICATIONS

This application is based upon and claims the benefit of priority from prior Japanese Patent Application No. 2008-038095, filed Feb. 20, 2008, the entire contents of which are incorporated herein by reference.

BACKGROUND OF THE INVENTION

1. Field of the Invention

The present invention relates to a device and a method of driving a stepping motor of an analog electronic clock.

2. Description of the Related Art

A stepping motor driving apparatus of an analog electronic clock includes a stepping motor and a driving section that drives the stepping motor. The stepping motor includes a rotor, a stator, and a coil. The driving section includes a detection circuit that detects whether or not the rotor is rotated immediately after the stepping motor is driven by a regular pulse having a certain pulse width. At this time, when the detection circuit detects non-rotation of the rotor, a correction pulse, by which the rotor may be rotated under a worst condition, is output immediately, and then switching is made to a wider pulse that is one level wider than the regular pulse to driving the rotor. When the detection circuit can detect rotations continuously for a predetermined number of times or a predetermined period (for example, 60 times or 60 seconds) (non-rotation is not detected), switching is made to a pulse that is one level narrower to driving the rotor.

As described above, by controlling to driving the rotor by a pulse that is narrower as much as possible, power consumption of a battery is restricted to the utmost.

However, in the stepping motor driving apparatus described above, when another high load element than the stepping motor is driven by the battery, a phenomenon where a voltage of the battery is lowered temporarily for a short period is occurred. When the rotor is not rotated due to the temporary lowering of the voltage for a short period, the correction pulse is output, and then the wider pulses are continuously output for a predetermined number of times or a predetermined period (for example, 60 times or 60 seconds), as described above.

For this reason, even if the lowering of a voltage is temporary for a short period and recovery of the voltage is made immediately, wider pulses that require higher power consumption than that of the regular pulse are continuously output for a predetermined number of times or a predetermined period, and wasteful power consumption is generated.

BRIEF SUMMARY OF THE INVENTION

According to an aspect of the present invention, there is provided a stepping motor driving apparatus of an analog electronic clock, comprising a stepping motor having a rotor, stator, and a coil; a pulse supply section that supplies one pulse of a plurality of pulses having different effective values to the coil in synchronization with a predetermined cycle; a rotation detection section that detects whether or not the rotor is rotated by an induced current generated in the coil, after the pulse supply section supplies the one pulse to the coil; a first switching control section that switches the one pulse supplied from the pulse supply section to the coil to another pulse having a larger effective value, when the rotation detection section does not detect rotation of the rotor after the pulse supply section supplies the one pulse to the coil; and a second switching control section that switches the another pulse supplied from the pulse supply section to the coil to a further pulse having a smaller effective value, when the rotation detection section detects rotation of the rotor continuously for a predetermined period or a predetermined number of times; wherein the apparatus further comprises a third switching control section that switches a driving pulse to a pulse having a smaller effective value when the rotation detection section detects that the rotor is not rotated for two times continuously even after the first switching control section increases an effective value of the driving pulse for two times continuously.

BRIEF DESCRIPTION OF THE SEVERAL VIEWS OF THE DRAWING

The accompanying drawings, which are incorporated in and constitute a part of the specification, illustrate embodiments of the invention, and together with a general description given herein and the detailed description of the embodiments given below, serve to explain the aspects of the invention.

FIG. 5A shows a time chart for supplying pulses from the stepping motor driving apparatus of an analog electronic clock in FIG. 1.

FIG. 5B shows a time chart for supplying pulses from the stepping motor driving apparatus of an analog electronic clock in FIG. 1.

FIG. 5C shows a time chart for supplying pulses from the stepping motor driving apparatus of an analog electronic clock in FIG. 1.

FIG. 5D shows a time chart for supplying pulses from the stepping motor driving apparatus of an analog electronic clock in FIG. 1.

DETAILED DESCRIPTION OF THE INVENTION

Figure 1:
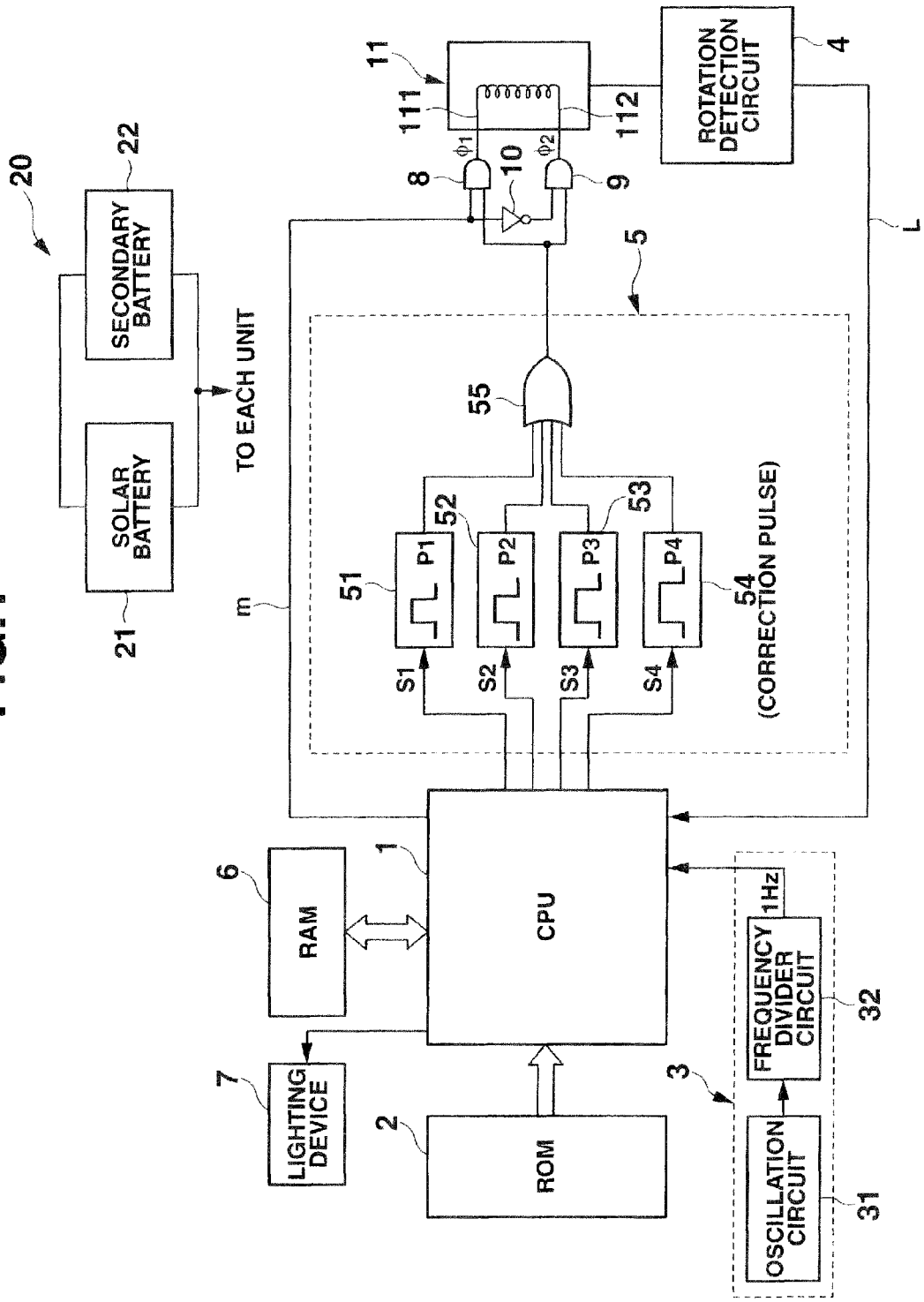
FIG. 1 is a circuit block diagram of a stepping motor driving apparatus of an analog electronic clock according to an embodiment of the present invention.

Hereinafter, an embodiment of the present invention will be described with reference to the accompanying drawings. FIG. 1 is a circuit block diagram showing a configuration of a stepping motor driving apparatus of an analog electronic clock of the embodiment. The stepping motor driving circuit has a configuration, in which each circuit section around a CPU 1 is connected to the CPU 1. A ROM 2 is a fixed memory that stores a program that controls the CPU 1, and the like. A 1-Hz signal generation section 3 is a circuit section that provides a 1-Hz signal as a clock signal to the CPU 1. The 1-Hz signal generation section 3 includes an oscillation circuit 31 and a frequency divider circuit 32 that divides a frequency of a signal from the oscillation circuit 31 to as low as 1 Hz.

In addition, a lighting device 7 for lighting a time display section of an analog electronic clock is provided. The lighting device 7 includes an electro-luminescence (EL) device. When the lighting device 7 is supplied with a signal from the CPU 1 that operates a lighting switch, the lighting device 7 lights up the EL device.

A rotation detection circuit 4 detects whether or not a rotor is rotated by a driving pulse that is applied to a driving coil 11 described later. When the rotation detection circuit 4 does not detect rotation, the rotation detection circuit 4 outputs a non-rotation, detection signal L to the CPU 1. A driving pulse sending out section 5 includes driving pulse generation circuits 51 to 54 that respectively receive selection signals S1 to S4 and send out driving pulses P1 to P4, and an OR gate 55 that receives the driving pulses P1 to P4 and sends out the driving pulses P1 to P4 to AND gates 8 and 9 described later. The driving pulses P1 to P4 have pulse widths that sequentially become wider and have larger effective values in this order. The widest driving pulse P4 is a correction pulse that may rotate a rotor 14 described later even under a worst condition.

A RAM 6 is a memory that exchanges data with the CPU 1. The RAM 6 includes a force flag that is turned on when the rotor is not rotated even when an effective value of a driving pulse is increased continuously for twice, a level-2 counter used for storing the number of times of continuous rotations that are made possible by a level-2 pulse (the driving pulse P2), a level-3 counter used for storing the number of times of continuous rotations that are made possible by a level-3 pulse (the driving pulse P3), and the like.

The AND gate 8 is opened by a polarity signal m output from the CPU 1 so as to select polarity of a driving pulse to be applied to the driving coil 11. The AND gate 9 is opened by a signal that is obtained by the polarity signal m inverted by an inverter 10. The AND gate 8 and the AND gate 9 provide a driving pulse sent from the driving pulse sending out section 5 to a coil end 111 and a coil end 112 of the driving coil 11 as applied pulses ø1 and ø2, respectively.

Figure 2:
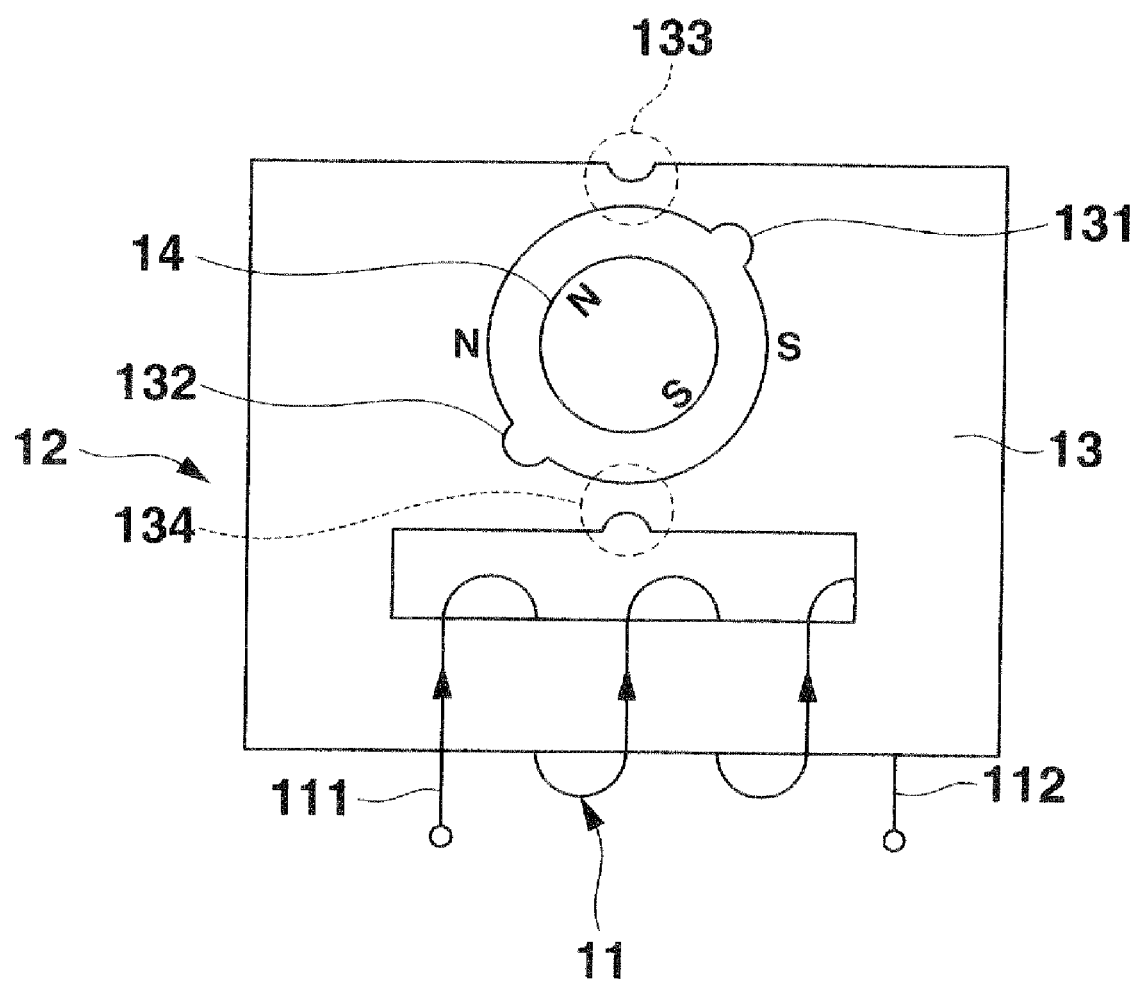
FIG. 2 is a schematic view showing a configuration of the stepping motor in FIG. 1.

FIG. 2 is a schematic view showing a configuration of a stepping motor 12. The stepping motor 12 includes a stator 13, the driving coil 11 that has the coil ends 111 and 112, and a rotor 14. The stator 13 is provided with notches 131 and 132, and also provided with supersaturation sections 133 and 134.

Therefore, a driving current flows through the driving coil 11, and the rotor 14 rotates by 180° by a magnetic force of the driving current. The rotation detection circuit 4 checks a voltage that is induced to the driving coil 11 when the rotor 14 is rotated. The rotation detection circuit 4 detects rotation or non-rotation of the rotor 14. When the rotor 14 is not rotated, the rotation detection circuit 4 sends out the non-rotation signal L to the CPU 1.

The rotor 14 meshes with a gear train (not shown), and a time indicator (not shown) is driven in accordance with rotation of the gear train. In addition, a power source device 20 including a solar battery 21 and a secondary battery 22 that is charged by an output current of the solar battery 21 is provided. The power source device 20 supplies power to each section.

Figure 3:
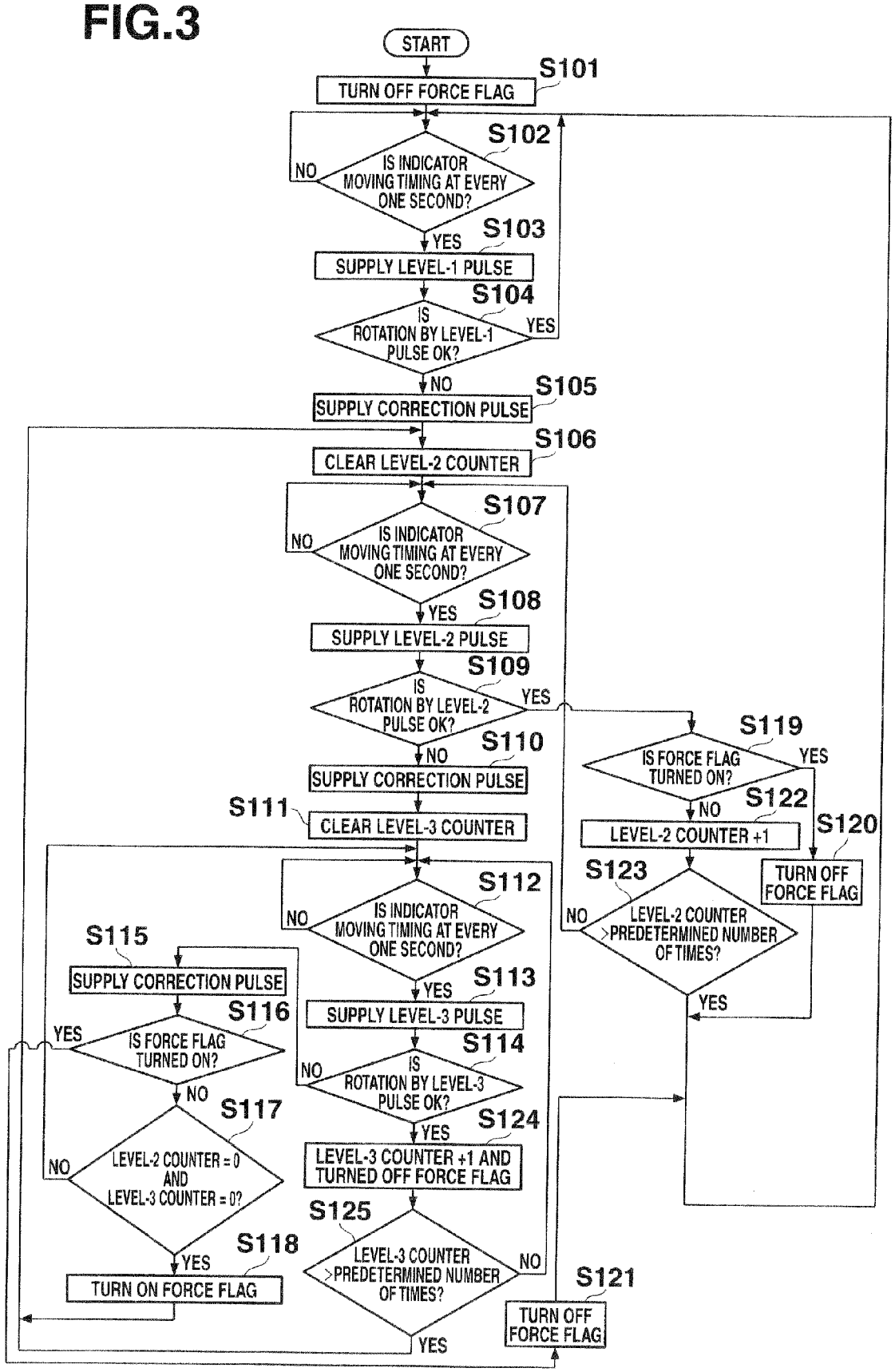
FIG. 3 is a flowchart showing processing steps of the stepping motor driving apparatus of an analog electronic clock in FIG. 1.

In the present embodiment according to the configuration described above, the CPU 1 executes processing as shown in a flowchart in FIG. 3 based on a program stored in the ROM 2.

First, description will be made with respect to a case as shown in a time chart showing a pulse supplying manner in FIG. 5B. In this case, level-1 pulses P1 are supplied at every one second, for example, and when non-rotation is detected, level-2 pulses are supplied after a level-4 pulse is supplied, and when non-rotation is not detected, the level-2 pulses are supplied for 60 times and then switching is made to the level-1 pulse supply.

That is, at a start time, the force flag in the RAM 6 is set to off first (Step S101).

Next, whether or not a second indicator moving timing at every one second is established is determined (Step S102). At the time the indicator moving timing at every one second is established, the level-1 pulses, that is, the driving pulses P1 based on the selection signal S1, are supplied from the driving pulse generation circuit 51 (Step S103). Next, whether or not the rotor 14 is rotated by the level-1 pulses, that is, whether the non-rotation detection signal L is output from the rotation detection circuit 4 is determined (Step S104). Then, when the non-rotation detection signal L is not output from the rotation detection circuit 4 and the rotor 14 is rotated (OK), the processing returns to Step S102.

Therefore, when the non-rotation detection signal L is not output from the rotation detection circuit 4, and the rotor 14 continues to rotate normally, a loop of Steps S102, S103, S104, and S102 in this order is repeated, and the stepping motor 12 continues to be driven by the driving pulse P1 having a narrowest width.

However, when the non-rotation detection signal L is output from the rotation detection circuit 4 while the loop is executed, determination in Step S104 results in NO. As a result, the processing moves from Step S104 to Step S105, and the correction pulse that is the driving pulse P4 based on the selection signal S4 is supplied from the driving pulse generation circuit 54 (Step S105). In this manner, the rotor 14 is rotated forcibly.

Next, the level-2 counter in the RAM 6 is cleared (Step S106). Then, whether or not the indicator moving timing at every one second is established is determined (S107).

At the time when the indicator moving timing at every one second is established, the level-2 pulse, that is, the driving pulse P2 based on the selection signal S2, is supplied from the driving pulse generation circuit 51 (Step S108). Next, whether or not the rotor 14 is rotated by the pulse P2 of the level-2 pulse, that is, whether the non-rotation detection signal L is output from the rotation detection circuit 4 is determined (Step S109).

At this time, when the non-rotation detection signal L is not output, from the rotation detection circuit 4 and the rotor 14 is rotated (OK), determination of Step S109 results in YES. Accordingly, the processing moves to Step S119, and whether or not the force flag is turned on is determined. Since the force flag is turned off in Step S101 described above, the determination in Step S119 results in NO.

Then, a value of the level-2 counter is counted up (Step S122), and whether or not a value of the level-2 counter after the count-up exceeds a predetermined number of times (for example, 60 times) is determined (Step S123). Then, a loop of Steps S107, S108, S109, S119, S122, S123, and S107 in this order is repeated until a value of the level-2 counter becomes higher than the predetermined number of times.

Then, after the loop is repealed for a predetermined number of times, the processing returns to Step S102. In this manner, a driving pulse is switched to the pulse P1 having a small effective value.

In addition, as shown in a time chart showing a pulse supplying manner in FIG. 5A, when non-rotation of the rotor 14 is detected in Step S109 while the loop of Steps S107, S108, S109, S119, S122, S123, and S107 in this order is executed, the correction pulse P4 is supplied from the driving pulse generation circuit 54 (Step S110). In this manner, the rotor 14 is rotated forcibly.

Next, after the level-3 counter in the RAM 6 is cleared (Step S106), whether or not the indicator moving timing at every one second is established is determined (Step S112). At the time when the indicator moving timing at every one second is established, the level-3 pulses, that is, the driving pulses P3 based on the selection signal S3, are supplied from the driving pulse generation circuit 53 (Step S108).

Next, whether or not the rotor 14 is rotated by the level-3 pulses, that is, the non-rotation detection signal L is output from the rotation detection circuit 4 is determined (Step S114).

When the non-rotation detection signal L is not output from the rotation detection circuit 4 and the rotor 14 is rotated (OK), determination of Step S114 results in YES. In this case, the processing moves from Step S114 to Step S124, a value of the level-3 counter is counted up, and whether or not a value of the level-3 counter after the count-up exceeds a predetermined number of times (for example, 60 times) is determined (Step S125). Then, a loop of Steps S112, S114, S124, S125, and S112 in this order is repeated until a value of the level-3 counter becomes higher than the predetermined number of times. When a value of the level-3 counter becomes higher than the predetermined number of times, the processing returns from Step S125 to Step S106.

Next, description will be made with respect to when the EL device is lit and the source voltage is lowered temporarily for a short period.

Where the rotor 14 continues to rotate normally by the driving pulses P1 having a narrowest width, a loop of Steps S102, S103, S104, and S102 in this order is repeated.

When the EL device is lit and the source voltage is lowered while the loop of Steps S102, S103, S104, and S102 in this order is executed, the rotor 14 can no longer be rotated by the driving pulse P1. For this reason, the determination in Step S104 results in NO, the processing moves from Step S104 to Step S105, and the correction pulse that is the driving pulse P4 based on the selection signal S4 is supplied from the driving pulse generation circuit 54 (Step S105). In this manner, the rotor 14 is rotated forcibly.

Next, after the level-2 counter in the RAM 6 is cleared (Step S106), whether or not the indicator moving timing at every one second is established is determined (Step S107). At the time when the indicator moving timing at every one second is established, the level-2 pulses, that is, the driving pulses P2 based on the selection signal S2, are supplied from the driving pulse generation circuit 52 (Step S108).

Next, whether or not the rotor 14 is rotated by the level-2 pulses, that is, the non-rotation detection signal L is output from the rotation detection circuit 4 is determined (Step S109).

When the source voltage is lowered, the rotor 14 cannot be rotated even by the driving pulse P2. Therefore, the rotor 14 is determined to be not rotated in Step S109, and the correction pulse, which is the driving pulse P4 based on the selection signal S4, is supplied from the driving pulse generation circuit 54 (Step S110). In this manner, the rotor 14 is rotated forcibly.

Next, after the level-3 counter in the RAM 6 is cleared (Step S111), whether or not the indicator moving timing at every one second is established is determined (Step S112). At the time when the indicator moving timing at every one second is established, the level-3 pulses, that is, the driving pulses P3 based on the selection signal S3, are supplied from the driving pulse generation circuit 53 (Step S113). Next, whether or not the rotor 14 is rotated by the level-3 pulse, that is, the non-rotation detection signal L is output from the rotation detection circuit 4 is determined (Step S114).

At this time, when the source voltage is lowered, the rotor 14 cannot be rotated even by the driving pulse P3. Therefore, the rotor 14 is determined to be not rotated in Step S114, and the correction pulse, which is the driving pulse P4 based on the selection signal S4, is supplied from the driving pulse generation circuit 54 (Step S115).

In this manner, the rotor 14 is rotated forcibly.

Next, whether or not the force flag is turned on is determined (Step S116). At this time, the force flag is in a state of being turned off in Step S101 described above. Therefore, determination in Step S116 results in NO, and the processing moves to Step S117. Then, in Step S117, whether or not the level-2 counter=0 and the level-3 counter=0 are obtained is determined. At this time, since the level-2 counter=0 is set in Step S106 and the level-3 counter=0 is set in Step S111 as described above, the determination in Step S117 results in YES. Accordingly, the force flag is turned on (Step S118), and then the processing returns to Step S106.

Then, when the processing from Step S106 described above is executed, the level-2 counter is cleared (Step S106). At the time the indicator moving timing at every one second is established (Step S107: YES), the level-2 pulse that is narrower than the level-3 pulse is supplied (Step S108). Next, whether or not the rotor 14 is rotated by the level-2 pulse, that is, whether or not the non-rotation detection signal L is output from the rotation detection circuit 4 is determined (Step S109).

At this time, when the non-rotation detection signal L is not output from the rotation detection circuit 4 and the rotor 14 is rotated (OK), determination of Step S109 results in YES. Accordingly, the processing moves to Step S119, and whether or not the force flag is turned on is determined. Since the force flag is turned on in Step S118 described above, the determination in Step S119 results in YES. Accordingly, after the force flag is turned off (Step S120), the processing returns to Step S102, and processing from Step S102 described above is executed.

Figure 4:
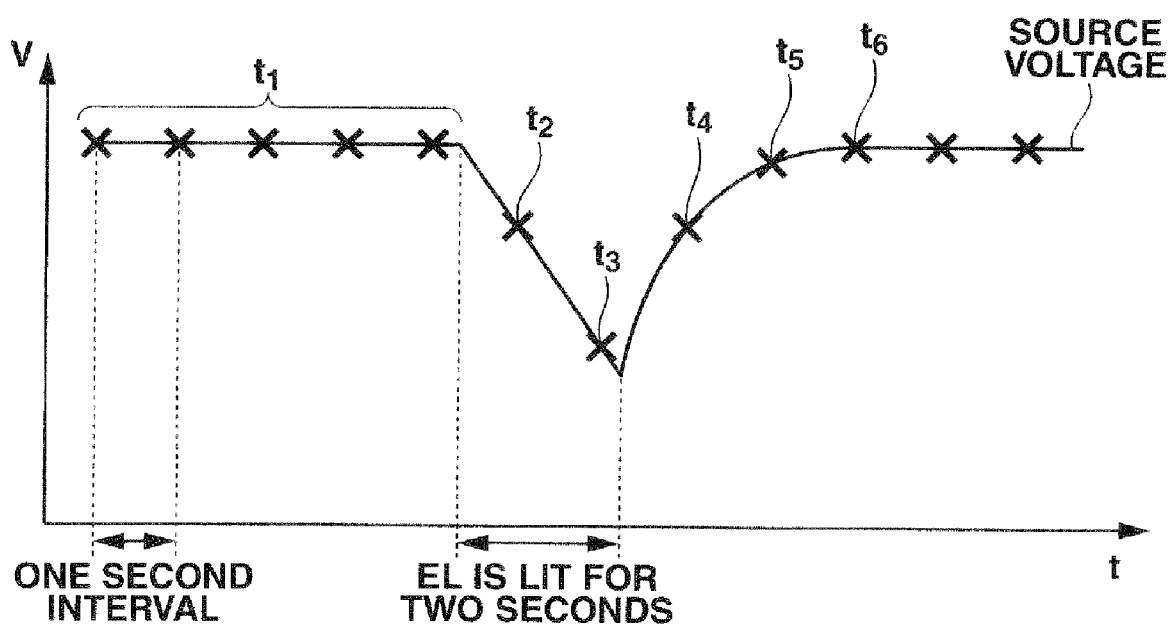
FIG. 4 is an operation explanation diagram of the stepping motor driving apparatus of an analog electronic clock in FIG. 1.

That is, a state described above is shown in FIG. 4. In FIG. 4, x marks indicate timings of supplying a driving pulse at every one second. In this case, during a state in which the determination OK (rotation) by the level-1 pulse at ti is made, non-rotation by the level-1 pulse is detected at t2, when the EL device provided on the clock is lit for two seconds. Although transition is made to the level-2 pulse driving, non-rotation is also detected at t3 even by the level-2 pulse driving. Also, although transition is made to the level-3 pulse driving, non-rotation is detected at t4 again even by the level-3 pulse driving. In this case, after the load (EL device lighting) of the source battery (for two seconds) is released, the source voltage is rapidly recovered after one second or so elapses. Therefore, when transition is made at t5 to the level-2 pulse driving, the rotation of the rotor 14 by the level-2 pulse is detected (Step S109: YES).

Further, since the source voltage is recovered, the rotor 14 can be rotated at t6 even by the level-1 pulse with the narrowest pulse width.

Therefore, when the processing advances through Steps S109, S119, S120, and S102 in this order and the processing from Step S102 is executed, many pulses with a wide width are never output continuously for a predetermined number of times or a predetermined period (for example, 60 times or 60 seconds) as described later when the temporary lowering of the source voltage for a short period is occurred due to lighting of the EL device for two seconds, for example, and the driving by the narrowest level-1 pulses is resumed at an early stage. Therefore, wasteful power consumption is prevented and a power saving effect can be increased.

When continuous non-rotation is detected by using the level-2 pulse driving and then the level-3 pulse driving, transition is made to the level-2 pulse in the above description.

However, in this case, transition may be made to the level-1 pulse driving, instead of the level-2 pulse driving.

On the other hand, as shown in a time chart showing a pulse supplying manner in FIG. 5D, when the processing from Step S106 is executed again and the rotor 14 is not rotated by the level-2 pulse again and the determination in Step S109 results in NO again, the processing advances through Steps S109, S110, S111, S112, S113, and S114, in this order in a similar manner as described above. In addition, when the rotor 14 is not rotated even by the level-3 pulse again, and the determination in Step S114 results in NO again, the processing advances through Steps S114, S115, and S116 in this order. However, since the force flag is turned on by the processing in Step S118, the determination in Step S116 results in YES. Therefore, the processing moves from Step S116 to Step S121 and the force flag is turned off. Then, the processing returns to Step S102.

Accordingly, driving by the level-1 pulse having the narrowest width is resumed at an early stage in this case as well. Therefore, wasteful power consumption is prevented and a power saving effect can be increased.

As described above, wasteful power consumption due to driving of a high-load element, such as the EL device causing the temporary lowering of the source voltage for a short period can be prevented, and a power saving effect can be increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stepping motor driving apparatus of an analog electronic clock, comprising,
a stepping motor having a rotor, a stator, and a coil;
a pulse supply section that supplies one pulse of a plurality of pulses having different effective values to the coil in synchronization with a predetermined cycle;
a rotation detection section that detects whether or not the rotor is rotated by an induced current generated in the coil, after the pulse supply section supplies the one pulse to the coil;
a first switching control section that switches the one pulse supplied from the pulse supply section to the coil to another pulse having a larger effective value, when the rotation detection section does not detect rotation of the rotor after the pulse supply section supplies the one pulse to the coil; and
a second switching control section that switches the another pulse supplied from the pulse supply section to the coil to a further pulse having a smaller effective value, when the rotation detection section detects rotation of the rotor continuously for a predetermined period or a predetermined number of times;
wherein the apparatus further comprises a third switching control section that switches a driving pulse to a pulse having a smaller effective value when the rotation detection section detects that the rotor is not rotated for two times continuously even after the first switching control section increases an effective value of the driving pulse for two times continuously.

2. The stepping motor driving apparatus according to claim 1, wherein
the third switching control section performs switching to the pulse having the smaller effective value, when the rotation detection section does not detect rotation of the rotor even after the first switching control section performs switching to a second pulse having a larger effective value than that of a first pulse and the second pulse having the larger effective value is supplied to the coil, and the rotation detection section does not detect rotation of the rotor even after the first switching control section again performs switching to a third pulse having an even larger effective value and the third pulse having the even larger effective value is supplied to the coil.

3. The stepping motor driving apparatus according to claim 1, wherein
magnitude of the effective values is determined by pulse widths.

4. The stepping motor driving apparatus according to claim 1, wherein the apparatus is energized by a power source section which further energizes a lighting section for lighting a time display device of the analog electronic clock.

5. The stepping motor driving apparatus according to claim 1, further comprising a power source section which includes a solar battery and a secondary battery.

6. The stepping motor driving apparatus according to claim 2, wherein the third switching control section is configured to switch to a second pulse having a smaller effective value.

7. The stepping motor driving apparatus according to claim 2, wherein the third switching control section is configured to switch to a first pulse having a smaller effective value.

8. The stepping motor driving apparatus according to claim 2, wherein the third switching control section is configured to switch to a second pulse and then to a first pulse when the rotation detection section detects rotation of the rotor after switching is performed to the second pulse.

9. A driving method of a stepping motor of an analog electronic clock, the stepping motor having a rotor, stator, and a coil, comprising:
a pulse supplying step for supplying one pulse of a plurality of pulses having different effective values to the coil in synchronization with a predetermined cycle;
a rotation detecting step for detecting whether or not the rotor is rotated by an induced current generated in the coil, after the one pulse is supplied to the coil;
a first switching control step for switching the one pulse supplied from the pulse supply section to the coil to another pulse having a larger effective value, when the rotation of the rotor is not detected after the one pulse is supplied to the coil; and
a second switching control step for switching the another pulse to a further pulse having a smaller effective value, when the rotation of the rotor is detected continuously for a predetermined period or a predetermined number of times;
wherein the method further comprises a third switching control step for switching a driving pulse to a pulse having a smaller effective value when the rotor is not rotated for two times continuously even after the first switching for increasing an effective value of the driving pulse for two times continuously.

10. The driving method according to claim 9, wherein
the third switching control step performs switching to a pulse having a smaller effective value, when the rotation detecting step does not detect rotation of the rotor even after the first switching control step performs switching to a pulse having a larger effective value and the pulse having the larger effective value is supplied, and the rotation detecting step does not detect rotation of the rotor even after the first switching control step again performs switching to a pulse having an even larger effective value and the pulse having the even larger effective value is supplied.

11. The driving method according to claim 10, wherein magnitude of the effective values is determined by pulse widths.

12. The driving method according to claim 10, wherein the pulse having a smaller effective value, to which switching is performed by the third switching control step, is a second pulse.

13. The driving method according to claim 10, wherein the pulse having a smaller effective value, to which switching is performed by the third switching control step, is a first pulse.

14. The driving method according to claim 10, wherein the third switching control step performs switching to a first pulse when the rotation detecting step detects rotation of the rotor after switching is made to a second pulse.

* * * * *